(12) United States Patent
Yang

(10) Patent No.: US 8,040,905 B2
(45) Date of Patent: Oct. 18, 2011

(54) METHOD AND SYSTEM FOR ESTABLISHING EMERGENCY CALL

(75) Inventor: Yanfei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 12/352,818

(22) Filed: Jan. 13, 2009
(Under 37 CFR 1.47)

(65) Prior Publication Data

US 2009/0122793 A1  May 14, 2009

Related U.S. Application Data

(63) Continuation of application No. PCT/CN2007/070320, filed on Jul. 19, 2007.

(30) Foreign Application Priority Data

Jul. 21, 2006  (CN) .......................... 2006 1 0103398

(51) Int. Cl.
*H04L 12/56* (2006.01)
*H04M 11/04* (2006.01)
*H04M 1/00* (2006.01)
*H04B 1/38* (2006.01)

(52) U.S. Cl. ...................... 370/401; 370/466; 455/404.1; 455/561

(58) Field of Classification Search ........................ None
See application file for complete search history.

(56) References Cited

U.S. PATENT DOCUMENTS

| 2002/0110104 | A1 |  | 8/2002 | Surdila et al. | |
|---|---|---|---|---|---|
| 2008/0008157 | A1 | * | 1/2008 | Edge et al. | 370/351 |
| 2008/0247384 | A1 | * | 10/2008 | Arauz-Rosado et al. | 370/352 |

FOREIGN PATENT DOCUMENTS

| CN | 1794829 | 6/2006 |
|---|---|---|
| CN | 101317493 B | 8/2011 |
| KR | 20040090023 | 10/2004 |
| WO | WO-2006056540 A1 | 6/2006 |

OTHER PUBLICATIONS

International Search Report for International Application No. PCT/CN2007/070320, dated Nov. 1, 2007, with English translation.
3GPP TS 24.229 V7.4.0 (Jun. 2006). Technical Specification. 3rd Generation Partnership Project; Technical Specification Group Core Network and Terminals; IP multimedia call control protocol based on Session Initiation Protocol (SIP) and Session Description Protocol (SDP); Stage 3 (Release 7).

* cited by examiner

*Primary Examiner* — Ayaz Sheikh
*Assistant Examiner* — Sori A Aga
(74) *Attorney, Agent, or Firm* — Harness, Dickey & Pierce, P.L.C.

(57) ABSTRACT

A method for establishing an emergency call includes: if an emergency call request message sent by a User Equipment (UE) contains an Internet Protocol Multimedia Subsystem Public User Identity (IMPU) in a TEL URI format, a Proxy-Call Session Control Function entity (P-CSCF) generates an IMPU in a Session Initiation Protocol (SIP) URI format according to the IMPU in the TEL URI format, sends both IMPUs to a Public Safety Answering Point (PSAP), and receives an emergency callback initiated by the PSAP. The PSAP initiates the emergency callback according to one of the two IMPUs. A system for establishing an emergency call includes a UE, a P-CSCF and a PSAP. The PSAP can always acquire the IMPU in the TEL URI format and the IMPU in the SIP URI format of the UE, and initiate an emergency callback to the UE according to the IMPU in the SIP URI format.

9 Claims, 3 Drawing Sheets

--Prior Art--

METHOD AND SYSTEM FOR ESTABLISHING EMERGENCY CALL

CROSS-REFERENCE TO RELATED APPLICATIONS

This application is a continuation of International Application No. PCT/CN2007/070320, filed Jul. 19, 2007. This application claims the benefit of Chinese Application No. 200610103398.7, filed Jul. 21, 2006. The disclosures of the above applications are incorporated herein by reference.

FIELD

The present disclosure relates to emergency service technologies, and more particularly, to a method and system for establishing an emergency call.

BACKGROUND

The statements in this section merely provide background information related to the present disclosure and may not constitute prior art.

Internet Protocol Multimedia Subsystem (IMS) is a subsystem supporting IP multimedia service, and is proposed by the 3rd Generation Partnership Project (3GPP) in Revision 5 (R5). The main feature of the IMS is using of Session Initiation Protocol (SIP) and the supports of access independence. The IMS is a multimedia control or call control platform in Packet-Switched (PS) domain. The IMS supports session multimedia services and non-session multimedia services, and provides a common service platform for the future multimedia application.

The emergency call is a special voice service function in mobile telecommunication system. Even in the case that call barring is set in a mobile terminal and that Subscriber Identity Module (SIM) is not inserted in the mobile terminal, when a user dials some special number such as 110, 119 or 120, the call will be forwarded to the corresponding Public Safety Answering Point (PSAP) such as police stations, fire departments and first aid centers as long as the mobile terminal is located in the area covered by the mobile network. Therefore, emergency aid service can be provided to users round the clock. Operations of the entire system are implemented jointly by telecom operators, fire departments, hospitals and the like.

Conventionally, the emergency call is implemented in the Circuit-Switched (CS) domain. While more and more networks adopt the IP technology, the PS domain begins to support the emergency call service gradually, and use the IMS system to control call signaling for the emergency session. The emergency call service provided by the IMS domain is called IMS Emergency Call, for short, IMS-EMER.

Subscriber identity in the IMS system is called IMS Public Identity (IMPU), and the IMPU is used when an IMS user requests to communicate with others. The IMPU is in SIP Uniform Resource Identifier (SIP URI) format or in Telephone Uniform Resource Identifier (TEL URI) format. The SIP URI takes the form of sip: user@domain, where the "user" stands for user name and the "domain" stands for domain name. The TEL URI takes the form of tel: number, where the "number" is generally international standard telephone number, i.e., E.164 number.

FIG. 1 is a flowchart of a conventional method for emergency call in an IMS domain. The method is described in further detail below.

In Block 101, a User Equipment (UE) sends an emergency call request message to a proxy call session control function entity (P-CSCF), the emergency call message contains an emergency call identifier. Further, the P-Preferred-Identity header of the emergency call request message contains an IMPU in TEL URI format or in SIP URI format.

In Block 102, the P-CSSF receives the emergency call request message, then, the P-CSCF checks whether the IMPU of the UE contained in the emergency call request message is in the TEL URI format or in the SIP URI format. If the IMPU is in the TEL URI format, Block 103 is performed. If the IMPU is in the SIP URI format, Block 105 is performed.

In Block 103, the P-CSCF checks whether the IMPU in the TEL URI format is valid. The IMPU in the TEL URI format is contained in the emergency call request message. If the IMPU in the TEL URI format is valid, Block 104 is performed; if the IMPU in the TEL URI format is not valid, the emergency call fails, and the process is terminated.

In Block 104, the P-CSCF generates a P-Asserted-Identity header in the emergency call request message, and the IMPU in the TEL URI format is contained in the P-Asserted-Identity header. Meanwhile, the P-CSCF deletes the P-Preferred-Identity header from the emergency call request message, and then sends the emergency call request message to an Emergency-CSCF (E-CSCF), and Block 106 is performed.

In Block 105, the P-CSCF generates a P-Asserted-Identity header in the emergency call request message, and generates an IMPU in the TEL URI format according to the IMPU in the SIP URI format contained in the emergency call request message. The IMPU in the TEL URI format and the IMPU in the SIP URI format are both contained in the P-Asserted-Identity header. Meanwhile, the P-CSCF deletes the P-Preferred-Identity header from the emergency call request message, and then sends the emergency call request message to the E-CSCF.

In Block 106, the E-CSCF forwards the emergency call request message to PSAP after receives the emergency call request message from the P-CSCF.

In Block 107, the PSAP receives the emergency call request message, and saves a UE calling identifier contained in the emergency call request message, i.e., saves the IMPU in the TEL URI format in the P-Asserted-Identity header, or saves the IMPU in the TEL URI format and the IMPU in the SIP URI format in the P-Asserted-Identity header.

When the PSAP determines to initiate an emergency callback to the UE, if the PSAP detects that the PSAP is located in the CS domain, the PSAP sends an emergency callback request message to the UE according to the IMPU in the TEL URI format, the emergency callback request message is sent to the UE via S-CSCF and P-CSCF in turn; if the PSAP detects that the PSAP is located in the PS domain, the PSAP checks whether the PSAP saves the IMPU in the SIP URI format. If the PSAP saves the IMPU in the SIP URI format, the PSAP sends the emergency callback request message to the UE via S-CSCF and P-CSCF in turn according to the IMPU in the SIP URI format. If the PSAP does not save the IMPU in the SIP URI format, the PSAP performs telephone number mapping (ENUM) function to find the IMPU in the SIP URI format according to the IMPU in the TEL URI format saved in the PSAP, and then sends the emergency callback request message to the UE via S-CSCF and P-CSCF in turn according to the IMPU in the SIP URI format.

SUMMARY

In one embodiment, the disclosure includes a method for establishing an emergency call including:

if a Proxy-Call Session Control Function entity (P-CSCF) receives an emergency call request message sent by a User Equipment (UE) and detects that the emergency call request message contains an Internet Protocol Multimedia Subsystem Public User Identity (IMPU) in a Telephone Uniform Resource Identifier (TEL URI) format, the P-CSCF generates an IMPU in a Session Initiation Protocol (SIP) URI format according to the IMPU in the TEL URI format; and sends the IMPU in the TEL URI format and the IMPU in the SIP URI format to a Public Safety Answering Point (PSAP); and receives an emergency callback initiated by the PSAP to the UE. The emergency callback is initiated by the PSAP according to one of the IMPU in the TEL URI format and the IMPU in the SIP URI format.

In various embodiments, the disclosure includes a system for establishing an emergency call including:

a User Equipment (UE), adapted to send an emergency call request message containing an Internet Protocol Multimedia Subsystem Public User Identity (IMPU) of the UE; a Proxy-Call Session Control Function (P-CSCF), adapted to detect that the IMPU of the UE is in a Telephone Uniform Resource Identifier (TEL URI) format, generate an IMPU in a Session Initiation Protocol (SIP) URI format according to the IMPU in the TEL URI format, and send the IMPU in the SIP URI format and the IMPU in the TEL URI format; and a Public Safety Answering Point (PSAP), adapted to initiate an emergency callback to the UE according to one of the IMPU in the SIP URI format and the IMPU in the TEL URI format which are received from the P-CSCF.

In various embodiments, the disclosure includes a Proxy-Call Session Control Function entity (P-CSCF) includes:

an Internet Protocol Multimedia Subsystem Public User Identity (IMPU) reception and detection module, adapted to receive an IMPU sent by User Equipment (UE), and send the IMPU to be converted if the IMPU is detected in a Telephone Uniform Resource Identifier (TEL URI) format; and an IMPU format conversion module, adapted to generate an IMPU in a Session Initiation Protocol (SIP) URI format according to the IMPU in the TEL URI format sent by the IMPU reception and detection module, and send the IMPU in the SIP URI format and IMPU in the TEL URI format to a Public Safety Answering Point (PSAP).

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In practice, if the PSAP is located in the PS domain and does not save the IMPU in the SIP URI format of the UE, the PSAP needs to perform the ENUM function to find the IMPU in the SIP URI format according to the saved IMPU in the TEL URI format to implement the emergency callback to the UE. If the PSAP does not support the ENUM function or the PSAP fails to find the IMPU in the SIP URI format of the UE by the ENUM function, thus the PSAP can not obtain the IMPU in the SIP URI format of the UE and can not call back the UE, resulting in a failure in the emergency callback initiated by the PSAP. For solving the problem, the various embodiments of the present provide the following methods and systems.

Figure 1:
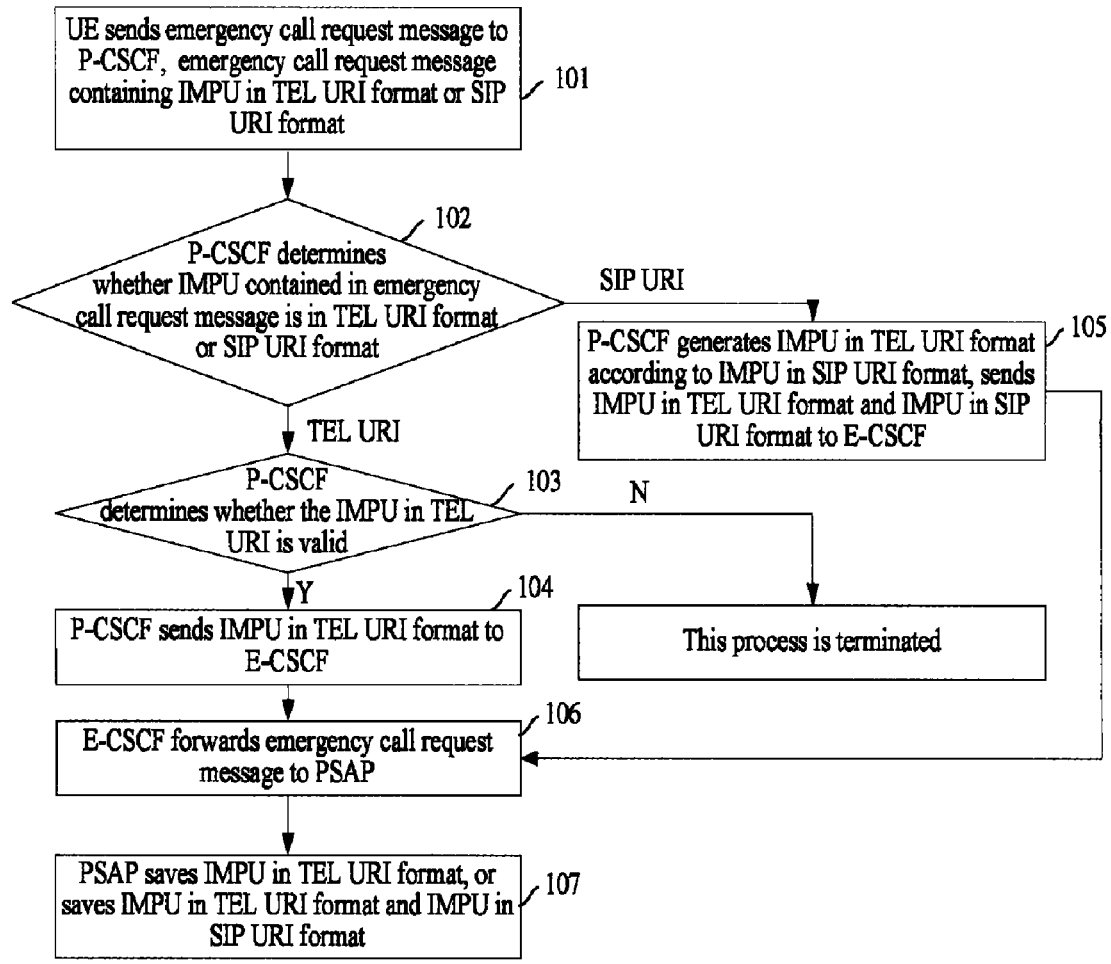
FIG. 1 is a flowchart of a conventional method for establishing an emergency call in an IMS domain of prior art.
Figure 2:
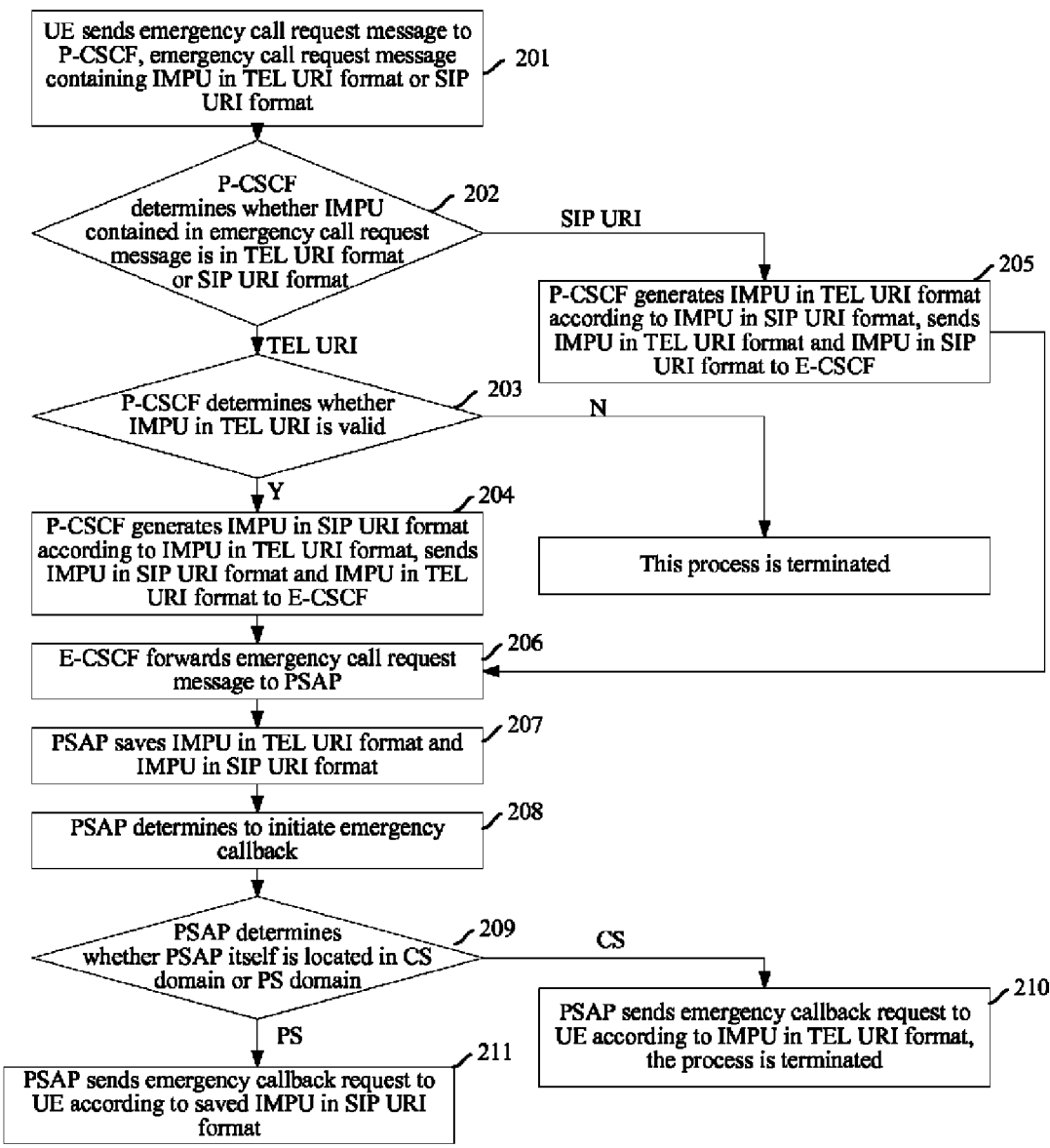
FIG. 2 is a flowchart of a method for establishing an emergency call in an IMS domain in accordance with an embodiment.

FIG. 2 illustrates a method for establishing an emergency call in an IMS domain in accordance with an embodiment. The method is described in further detail below.

In Block 201, a UE sends an emergency call request message to a P-CSCF. The request message contains an emergency identifier, and an IMPU in the TEL URI format or an IMPU in the SIP URI format. The IMPU is contained in the P-Preferred-Identity header of the emergency call request message.

In Block 202, the P-CSCF receives the emergency call request message, then the P-CSCF checks whether the IMPU contained in the emergency call request message is in the TEL URI format or in the SIP URI format. If the IMPU is in the TEL URI format, Block 203 is performed. If the IMPU is in the SIP URI format, Block 205 is performed.

In Block 203, the P-CSCF checks whether the IMPU in the TEL URI format is valid. The IMPU in the TEL URI format is contained in the emergency call request message. If the IMPU in the TEL URI format is valid, Block 204 is performed; if the IMPU in the TEL URI format is not valid, the emergency call fails, and the process is terminated.

In Block 204, the P-CSCF generates a P-Asserted-Identity header in the emergency call request message, and generates an IMPU in the SIP URI format according to the IMPU in the TEL URI format. The IMPU in the SIP URI format and the IMPU in the TEL URI format are both contained in the P-Asserted-Identity header. Meanwhile, the P-CSCF deletes the P-Preferred-Identity header from the emergency call request message, and then sends the emergency call request message to an E-CSCF, and Block 206 is performed.

The P-CSCF generates the IMPU in the SIP URI format according to the IMPU in the TEL URI format in the following two methods.

In one method, the P-CSCF finds the IMPU in the SIP URI format associated with the IMPU in the TEL URI format according to an associated relation between the IMPU in the TEL URI format and the IMPU in the SIP URI format. The associated relation is saved by the P-CSCF during a registration process.

In the registration process, an S-CSCF sends a registration response message to the P-CSCF, the registration response message contained a P-Associated-URI header, the P-Associated-URI contains an implicit registration set of the UE. The implicit registration set contains the IMPU in the TEL URI format of the UE and the IMPU in the SIP URI format of the UE. The implicit registration set of the UE is saved in the P-CSCF.

In the other method, in the registration process, the P-CSCF parses the SIP URI of the S-CSCF, and obtains a home domain name of the UE. The SIP URI of the S-CSCF is saved by the P-CSCF during the registration process. The P-CSCF obtains an E.164 number of the UE according to the IMPU in the TEL URI format of the UE, and combines the E.164 number of the UE with the home domain name of the UE to obtain the IMPU in the SIP URI format of the UE.

For example, the IMPU in the TEL URI format of the UE is: tel: +86-10-8888888, the E.164 number of the UE is: +86-10-8888888. If the SIP URI of the S-CSCF saved in the P-CSCF is: sip: orig@scscf1.home1.net, the home domain name of the UE is "home1.net". Therefore, the IMPU in the SIP URI format of the UE is: sip: +86-10-8888888@home1.net; user=phone. Where "user=phone" indicates that the IMPU in the SIP URI format can be transformed into the IMPU in the TEL URI format equivalently, i.e., the content ahead of the domain name of the IMPU in the SIP URI format is the E.164 number of the IMPU in the TEL URI format.

In Block 205, the P-CSCF generates a P-Asserted-Identity header in the emergency call request message, and generates an IMPU in the TEL URI format according to the IMPU in the SIP URI format contained in the emergency call request message. The IMPU in the TEL URI format and the IMPU in the SIP URI format are both contained in the P-Asserted-Identity header. Meanwhile, the P-CSCF deletes the P-Preferred-Identity header from the emergency call request message, and sends the emergency call request message to the E-CSCF.

In the Block 205, the P-CSCF finds the IMPU in the TEL URI format of the UE associated with the IMPU in the SIP URI format of the UE, according to the associated relation between the IMPU in the SIP URI format and the IMPU in the TEL URI format. The IMPU in the SIP URI format of the UE is contained in the emergency call request message sent by the UE. The associated relation is saved by the P-CSCF during the registration process.

In Block 206, the E-CSCF forwards the emergency call request message to the PSAP after receiving the emergency call request message.

In Block 207, the PSAP saves the IMPU in the TEL URI format and the IMPU in the SIP URI format after receiving the emergency call request message. The IMPU in the TEL URI format and the IMPU in the SIP URI format are contained in the emergency call request message.

In Blocks 208, the PSAP determines to initiate an emergency callback to the UE.

In Blocks 209, the PSAP checks whether the PSAP itself is located in the CS domain or the PS domain. If the PSAP is in the CS domain, Block 210 is performed. If the PSAP is in the PS domain, Block 211 is performed.

In Block 210, the PSAP sends the emergency callback request message to the UE via the S-CSCF and the P-CSCF in turn according to the IMPU in the TEL URI format. The IMPU in the TEL URI format is saved in the PSAP.

In Block 211, the PSAP sends the emergency callback request message to the UE via the S-CSCF and the P-CSCF in turn according to the IMPU in the SIP URI format. The IMPU in the SIP URI format is saved in the PSAP.

Compared with the prior art, if the IMPU in the TEL URI format is detected in the emergency call request message sent by the UE, the P-CSCF generates the IMPU in the SIP URI format according to the IMPU in the TEL URI format, and sends the IMPU in the SIP URI format and the IMPU in the TEL URI format jointly to the PSAP. Therefore, the PSAP in the PS domain can always acquire the IMPU in the TEL URI format of the UE and the IMPU in the SIP URI format of the UE. If the PSAP does not support the ENUM function, it can also initiate an emergency callback to the UE according to the IMPU in the SIP URI format saved in the PSAP. Consequently, the PSAP in the PS domain will have a much better chance of successfully initiating an emergency callback. If the PSAP supports the ENUM function, it can initiate an emergency callback to the UE directly according to the IMPU in the SIP URI format saved in the PSAP, instead of searching for the IMPU in the SIP URI format of the UE through the ENUM function, thereby shortening the duration of establishing an emergency call.

Figure 3:
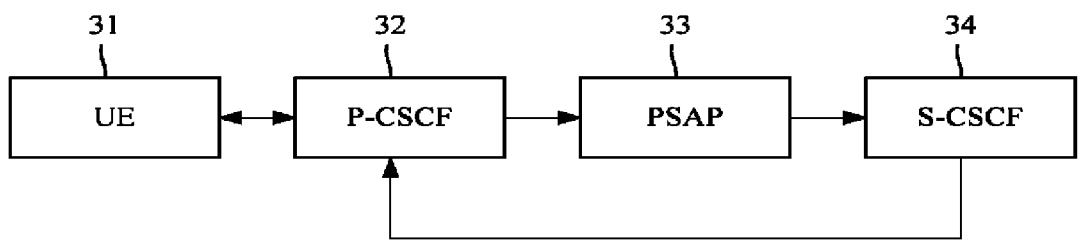
FIG. 3 is a schematic diagram illustrates a system for an emergency call in an IMS domain in accordance with an embodiment.

FIG. 3 illustrates the constitution of the system for establishing an emergency call in the IMS domain in accordance with an embodiment. The system includes a UE 31, a P-CSCF 32, a PSAP 33 and an S-CSCF 34.

The UE 31 sends an emergency call request message to the P-CSCF 32, and receives an emergency callback request message sent by the P-CSCF 32. The emergency call request message contains an IMPU in the TEL URI format of the UE or an IMPU in the SIP URI format of the UE.

The P-CSCF 32 receives the emergency call request message sent by the UE 31. If the P-CSCF 32 detects that the emergency call request message contains the IMPU in the TEL URI format, it generates an IMPU in the SIP URI format according to the IMPU in the TEL URI format. If the P-CSCF 32 detects that the emergency call request message contains the IMPU in the SIP URI format, it generates an IMPU in the TEL URI format according to the IMPU in the SIP URI format. The P-CSCF 32 sends the emergency call request message to the PSAP 33, and the emergency call request message contains both the IMPU in the SIP URI format and the IMPU in the TEL URI format. Further, the P-CSCF 32 sends the emergency callback request message which sent by S-CSCF 34 to the UE 31.

The PSAP 33 receives and saves both the IMPU in the SIP URI format and the IMPU in the TEL URI format which are contains in the emergency call request message sent by the P-CSCF 32. When the PSAP 33 determines to initiate an emergency callback to the UE 31, if the PSAP 33 is located in a CS domain, the PSAP 33 sends the emergency callback request message to the UE 31 via the S-CSCF 34 and the P-CSCF 32 according to the IMPU in the TEL URI format, the IMPU in the TEL URI format is saved in the PSAP 33 itself. If the PSAP 33 is in a PS domain, the PSAP 33 sends the emergency callback request message to the UE 31 via the S-CSCF 34 and the P-CSCF 32 according to the IMPU in the SIP URI format, the IMPU in the SIP URI format is saved in the PSAP 33 itself.

The S-CSCF 34 sends the emergency callback request message to the P-CSCF 32, the emergency callback request message is sent by the PSAP 33.

Figure 4:
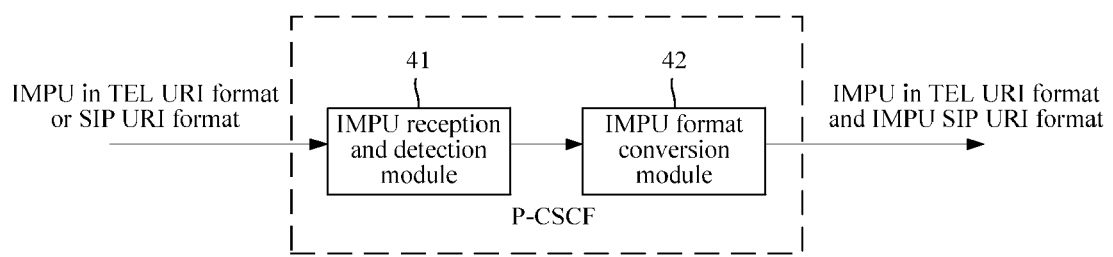
FIG. 4 is a schematic diagram of a P-CSCF in accordance with an embodiment.

FIG. 4 illustrates the schematic diagram of the structure of the P-CSCF in accordance with an embodiment. As shown in FIG. 4, the P-CSCF mainly includes an IMPU reception and detection module 41 and an IMPU format conversion module 42.

The IMPU reception and detection module 41 receives an emergency call request message sent by a UE. The emergency call request message contains an IMPU. The IMPU reception and detection module 41 sends the IMPU to the IMPU format conversion module 42 if the IMPU is detected in the TEL URI format. Furthermore, the IMPU reception and detection module 41 sends the IMPU to the IMPU format conversion module 42 if the IMPU is detected in the SIP URI format.

The IMPU format conversion module 42 generates an IMPU in the SIP URI format according to the IMPU in the TEL URI format which is sent by the IMPU reception and detection module 41, and sends the emergency call request message to the PSAP. The emergency call request message contains both the IMPU in the SIP URI format and the IMPU in the TEL URI format.

Furthermore, the IMPU format conversion module 42 generates an IMPU in the TEL URI format according to the IMPU in the SIP URI format which is sent by the IMPU reception and detection module 41, and sends the emergency call request message to the PSAP. The emergency call request message contains both the IMPU in the TEL URI format and the IMPU in the SIP URI format.

Though illustration and description of the present disclosure have been given with reference to various embodiments thereof, it should be appreciated by persons of ordinary skill in the art that various changes in forms and details can be made without deviation from the spirit and scope of this disclosure, which are defined by the appended claims.

What is claimed is:

1. A method for establishing an emergency call, comprising:
    receiving, by a Proxy-Call Session Control Function entity, P-CSCF, an emergency call request message;
    if the emergency call request message contains an Internet Protocol Multimedia Subsystem Public User Identity, IMPU, in a Telephone Uniform Resource Identifier, TEL URI, format, generating, by the P-CSCF, an IMPU in a Session Initiation Protocol, SIP, URI format according to the IMPU in the TEL URI format;
    sending, by the P-CSCF, the IMPU in the TEL URI format and the IMPU in the SIP URI format to a Public Safety Answering Point, PSAP; and
    receiving, by the P-CSCF, an emergency callback from the PSAP according to the IMPU in the TEL URI format or the IMPU in the SIP URI format.

2. The method of claim 1, wherein an associated relation between the IMPU in the TEL URI format and the IMPU in the SIP URI format is saved by the P-CSCF during a registration procedure.

3. The method of claim 2, wherein the generating, by the P-CSCF, the IMPU in the SIP URI format according to the IMPU in the TEL URI format, comprises:
    searching, by the P-CSCF, in the associated relation saved in the P-CSCF, for the IMPU in the SIP URI format associated with the IMPU in the TEL URI format.

4. The method of claim 1, wherein the P-CSCF saves the SIP URI of an S-CSCF during a registration procedure.

5. The method of claim 4, wherein the generating, by the P-CSCF, the IMPU in the SIP URI format according to the IMPU in the TEL URI format, comprises:
    obtaining, by the P-CSCF, the IMPU in the SIP URI format of the UE according to the SIP URI of the S-CSCF and the IMPU in the TEL URI format of the UE.

6. The method of claim 5, wherein the obtaining, by the P-CSCF, the IMPU in the SIP URI format of the UE according to the SIP URI of the S-CSCF and the IMPU in the TEL URI format of the UE, comprises:
    obtaining, by the P-CSCF, an E.164 number of the UE according to the IMPU in the TEL URI format of the UE,
    obtaining, by the P-CSCF, a home domain name of the UE by parsing the SIP URI of the S-CSCF, and
    combining, by the P-CSCF, the E.164 number of the UE with the home domain name of the UE.

7. The method of claim 1, wherein the emergency callback initiated by the PSAP, comprises:
    if the PSAP is located in a Circuit-Switched, CS, domain, the emergency callback is initiated by the PSAP according to the IMPU in the TEL URI format saved in the PSAP; and
    if the PSAP is located in a Packet-Switched, PS, domain, the emergency callback is initiated by the PSAP according to the IMPU in the SIP URI format saved in the PSAP.

8. A system for establishing an emergency call, comprising:
    a User Equipment, UE, configured to send an emergency call request message to a Proxy-Call Session Control Function, P-CSCF, wherein the emergency call request message contains an Internet Protocol Multimedia Subsystem Public User Identity, IMPU, of the UE;
    the P-CSCF, configured to generate an IMPU in a Session Initiation Protocol, SIP, URI format, where the IMPU of the UE contained in the emergency call request message received from the UE is in a Telephone Uniform Resource Identifier, TEL URI, format, and send the IMPU in the SIP URI format and the IMPU in the TEL URI format to a Public Safety Answering Point, PSAP; and
    the PSAP, configured to initiate an emergency callback to the UE according to one of the IMPU in the SIP URI format and the IMPU in the TEL URI format received from the P-CSCF.

9. A Proxy-Call Session Control Function, P-CSCF, comprising: an Internet Protocol Multimedia Subsystem Public User Identity, IMPU, reception and detection module, and an IMPU format conversion module, wherein,
    the IMPU reception and detection module is configured to receive an IMPU sent by a User Equipment, UE, and send the IMPU to the IMPU format conversion module if the IMPU is in a Telephone Uniform Resource Identifier, TEL URI, format;
    the IMPU format conversion module is configured to generate an IMPU in a Session Initiation Protocol, SIP, URI format according to the IMPU in the TEL URI format: and
    the P-CSCF is further configured to send the IMPU in the SIP URI format and the IMPU in the TEL URI format to a Public Safety Answering Point, PSAP.

* * * * *